United States Patent [19]

Istel et al.

[11] Patent Number: 4,837,265
[45] Date of Patent: Jun. 6, 1989

[54] PROCESS FOR THE PREPARATION OF STABILIZED POLYAMIDES

[75] Inventors: Erich Istel, Dormagen; Franz Zimmermann, Neuss, both of Fed. Rep. of Germany

[73] Assignee: Bayer Aktiengesellschaft, Leverkusen, Fed. Rep. of Germany

[21] Appl. No.: 1,317

[22] Filed: Jan. 8, 1987

[30] Foreign Application Priority Data

Jan. 15, 1986 [DE] Fed. Rep. of Germany ....... 3600890

[51] Int. Cl.$^4$ .......................... C08K 3/10; C08K 3/16; C08K 5/34; C08L 77/00
[52] U.S. Cl. .................................. 524/413; 523/351; 524/401; 524/436; 525/432
[58] Field of Search ...................... 524/401, 413, 436; 523/351; 525/432

[56] References Cited

U.S. PATENT DOCUMENTS 4,195,015 3/1980 Delsens et al. ...................... 524/413
4,292,194 9/1981 Perazzoni et al. .................. 524/413

FOREIGN PATENT DOCUMENTS 0063687 11/1982
1170639 5/1964 Fed. Rep. of Germany.

OTHER PUBLICATIONS

Patent Abstracts of Japan–May 26, 1984, vol. 8, No. 114.

*Primary Examiner*—Allan M. Lieberman
*Attorney, Agent, or Firm*—Sprung, Horn, Kramer & Woods

[57] ABSTRACT

Stabilized shaped articles of polyamides are prepared in a simple manner, using a copper-I halide and a molar excess of an alkali or alkaline earth metal halide, by mixing copper(I)-halide and alkali or alkaline earth metal halide with caprolactum, polymerizing the mixture, granulating the melt of the stabilizer concentrate and processing the granules together with the granulated polyamide which is to be stabilized, to give shaped articles.

3 Claims, No Drawings

PROCESS FOR THE PREPARATION OF STABILIZED POLYAMIDES

The invention relates to a process for the preparation of shaped articles from high-molecular synthetic polyamides, which are stabilized against aging due to light, heat and weathering effects.

Synthetic high-molecular polyamides, such as nylon-6, nylon 66, nylon 11 and others are degraded under the action of light and heat and also by other weathering effects. This molecular degradation, which can be considerably accelerated by photoactive pigments, absorbed organic and inorganic acid and other materials, leads to a sharp deterioration in the mechanical properties. Shaped articles having a large surface area, such as fibres, filaments, wires and sheets or films, where a rapid decrease in breaking stress and elongation at break occurs if stabilization is insufficient, are at particular risk.

Numerous proposals have been made as to how high-molecular synthetic polyamides can be stabilized. According to DE-OS (German Published Specification) No. 2,421,802, copper complex compounds are used which consist of copper(I)-halides and a 2-fold to 27-fold molar quantity of lithium halides. The complex compounds must first be prepared in a separate process, before they can be used for stabilization.

According to a further proposal (DE-OS (German Published Specification) No. 2,605,794), a copper salt, an alkali metal halide or alkaline earth metal halide and a glycol are added separately or together to the polyamide compositions before or after polymerization.

In both cases, the stabilizer or the stabilizer components are added directly to the polyamide which is to be formed.

It has now been found, surprisingly, that preforming of the copper complex or the additional use of a glycol can be omitted and excellent stabilization can nevertheless be obtained, when copper(I)-halide and a molar excess, relative to the copper(I)-halide, of an alkali metal halide or alkaline earth metal halide compound are mixed with caprolactum, the mixture is polymerized to give a stabilizer concentrate, and the polymer is processed into granules which are added to the polyamide which is to be stabilized.

The invention therefore relates to a process for the preparation of shaped articles from stabilized, synthetic high-molecular polyamides with the use of a copper(I)-halide and a molar excess, relative to copper(I)-halide, of an alkali metal halide or alkaline earth metal halide, which is characterized in that copper(I)-halide and an alkali or alkaline earth metal halide are mixed with caprolactam, the mixture is polymerized, the melt of the stabilizer concentrate is granulated and the granules are processed together with the granulated polyamide which is to be stabilized, to give shaped articles.

The quantity of copper is preferably such that 10 to 100 mg of Cu(I)/kg of polyamide, in particular 30 to 60 mg of Cu(I)/kg of polyamide, are present in the finished shaped article. The concentrate is preferably incorporated in a quantity of at least 0.5% by weight, preferably 1 to 6% by weight, relative to polyamide and concentrate, into the polyamide which is to be stabilized.

The polyamides to be stabilized are preferably nylon 6, nylon 66 and nylon 11.

The molar excess of the alkali or alkaline earth metal halide is preferably 100 to 1000%, in particular 300 to 800%.

The polymerization is carried out at 240° to 290° C. and under pressure from 0.1 to 10 bar.

Furthermore, pigments which are stable during the polymerization, such as carbon black, titanium dioxide or copper phthalocyanin, can be added to the polymerization batch.

EXAMPLE 1

A mixture of 146.1 kg of caprolactam, 15 kg of water, 3 kg of LiBr and 0.9 kg of CuI is homogenized for 5 minutes in a vessel fitted with a high-speed stirrer and is then put into a polymerization autoclave. With stirring, the mixture is heated under a pressure of 4-5 bar within about 90 minutes to 260° C. After 3 hours, the autoclave is let down and the condensation of the melt is allowed to continue with stirring for 3 hours under a stream of 50 l/hour of dry nitrogen, formed into tows on a casting belt and granulated. The concentrate granules contain 0.2% by weight of monovalent copper Cu(I) and 2% by weight of LiBr.

If the batch mixture contains only 96.1 kg of caprolactam, concentrate granules result which contain 0.3% by weight of Cu(I) and 3.0% by weight of LiBr. Depositions of metallic copper do not occur.

EXAMPLE 2

In an autoclave according to Example 1, a mixture of 37.9 kg of caprolactam, 0.48 kg of CuI, 1.6 kg of LiBr and 80 kg of a carefully prepared 50% by weight titanium, dioxide dispersion (rutile modification) in equal parts of caprolactam and water is polymerized, a maximum gauge pressure of 4 bar being maintained by blowing off during the heating-up phase. This gives combined concentrate granules with 40% by weight of titanium dioxide pigments, a Cu(I) content of 0.16% by weight and 1.6% by weight of LiBr. Depositions of metallic copper do not occur.

EXAMPLE 3

30 kg of carbon black are carefully homogenized in a mixture of 29 kg of water and 86 kg of caprolactam and are put into the vessel of the polymerization unit together with 3 kg of LiBr and 0.9 kg of CuI, and the contents are mixed and polymerized. The black concentrate granules contain 25% by weight of carbon black, 0.25% by weight of Cu(I) and 2.5% by weight of LiBr. Depositions of metallic copper do not occur.

EXAMPLE 4

In a glass apparatus fitted with a condensate receiver and a stirrer unit, 130 g of caprolactam and 7.6 g of 6-aminocaproic acid are mixed with a solution of 0.9 g of CuI and 3 g of LiBr (about 7.3 mol relative to CuI) in 15 g of water and 15 g of caprolactam with exclusion of oxygen and are heated for 8 hours to 265° C. under an $N_2$ blanketing pressure of about 0.1 bar. The copper concentrate/polyamide melt is almost colourless and completely transparent. No copper particles formed due to thermal decomposition. The Cu(I) content is about 0.2% by weight.

With equimolar additions of other halide pairs, Cu(I) concentrate melts without depositions of metallic copper particles are likewise obtained:

| Cu(I) compound | Alkali metal halide | Visual assessment of the melt |
| --- | --- | --- |
| 0.42 g of CuCN | 3 g of LiBr | slightly yellowish, transparent |
| 0.47 g of CuCl | 3 g of LiBr | slightly yellowish, transparent |
| 0.9 g of CuI | 4.1 g of KBr | colourless, slight opalescence |
| 0.9 of CuI | 5.7 g of KI | colourless, transparent |
| 0.67 g of CuBr | 3 g of LiBr | slightly yellowish, transparent |

All the Cu(I) concentrates contain about 0.2% by weight of Cu(I) and about 7.3 mol of alkali metal halide, relative to the Cu compound.

EXAMPLE 5

The following granule mixtures were prepared for extruder-spinning tests:

| Mixture | Nylon 6 granules % by weight | Concentrate granules % by weight |
| --- | --- | --- |
| 5.1 | 100.0 | 0.0 |
| 5.2 | 98.5 | 1.5 according to Example 1 |
| 5.3 | 97.0 | 3.0 according to Example 1 |
| 5.4 | 96.25 | 3.75 of TiO$_2$R concentrate, 40% by weight |
| 5.5 | 96.25 | 3.75 according to Example 2 |
| 5.6 | 94.75 | 3.75 according to Example 2 + 1.5 according to Example 1 |

The 6 granule mixtures are spun on an extruder-spinning unit with a high-efficiency melt-mixer and -filter (mesh width 17 μm) to give monofils of 0.20 mm diameter for weathering in the open, and dtex 100 f 25 multifil yarns for the Xenotest exposure. No filter blockage due to metallic Cu particles is found.

The aging resistance of the spun products is characterized by the values for breaking stress loss:

| | | | Values of breaking stress loss % | |
| --- | --- | --- | --- | --- |
| Mixture | Cu(I) content mg of Cu(I)/kg | TiO$_2$ content % by weight | 0.20 mm monofils, weathering for 6 months | dtex 100 f 500 hours, Xenotest exposure |
| 5.1 | 0 | 0 | 49 | 22 |
| 5.2 | 30 | 0 | 38 | 14 |
| 5.3 | 60 | 0 | 34 | 11 |
| 5.4 | 0 | 1.5 | 56 | 64 |
| 5.5 | 30 | 1.5 | 25 | 9 |
| 5.6 | 60 | 1.5 | 21 | 3 |

We claim:

1. Process for the preparation of shaped articles from stabilized, synthetic, high-molecular polyamides with the use of a copper (I)-halide and a molar excess from about 100 to 1000%, relative to copper (I)-halide, of an alkali metal halide or alkaline earth metal halide, characterized in that copper I halide and alkali or alkaline earth metal halide are mixed with caprolactam to form a concentrate, the concentrate in at least 0.5% by weight is mixed with additional polyamide, and the mixture is polymerized for a time sufficient to ensure a good dispersion, the melt of the stabilizer concentrate is granulated and the granules are processed together with granulated polyamide which is to be stabilized, to give shaped articles containing about 10 to 100 mg of Cu-(I)/kg of polyamide.

2. Process according to claim 1, characterized in that 1 to 6% by weight of concentrate, relative to polyamide and concentrate, are incorporated into the polyamide.

3. Process according to claim 1, wherein the alkali or alkaline earth metal halide comprises lithium bromide.

* * * * *

UNITED STATES PATENT AND TRADEMARK OFFICE
CERTIFICATE OF CORRECTION

PATENT NO. : 4,837,265
DATED : June 6, 1989
INVENTOR(S) : Istel et al

It is certified that error appears in the above-identified patent and that said Letters Patent is hereby corrected as shown below:

Title page FOREIGN PATENT DOCUMENTS: After "0063687 11/1982" add
—European—

Signed and Sealed this

Thirteenth Day of March, 1990

Attest:

JEFFREY M. SAMUELS

Attesting Officer

Acting Commissioner of Patents and Trademarks